(12) United States Patent
Krishnamurthi et al.

(10) Patent No.: US 9,395,494 B2
(45) Date of Patent: Jul. 19, 2016

(54) OPTICAL DEVICE USING ECHELLE GRATING THAT PROVIDES TOTAL INTERNAL REFLECTION OF LIGHT

(71) Applicant: INTEL CORPORATION, Santa Clara, CA (US)

(72) Inventors: Mahesh Krishnamurthi, San Jose, CA (US); I-Wei Hsieh, Santa Clara, CA (US); Haisheng Rong, Pleasanton, CA (US); Oshrit Harel, Qiryat Gat (IL); Harel Frish, Qiryat Gat (IL); Assia Barkai, Qiryat Gat (IL); Wenhua Lin, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/971,948

(22) Filed: Dec. 16, 2015

(65) Prior Publication Data
US 2016/0103282 A1   Apr. 14, 2016

Related U.S. Application Data

(63) Continuation of application No. 14/334,260, filed on Jul. 17, 2014, now Pat. No. 9,250,388.

(51) Int. Cl.
*G02B 6/12* (2006.01)
*G02B 6/136* (2006.01)
(Continued)

(52) U.S. Cl.
CPC ............ *G02B 6/29328* (2013.01); *G02B 6/124* (2013.01); *G02B 6/12004* (2013.01);
(Continued)

(58) Field of Classification Search
CPC ................ G02B 6/2938; G02B 6/136; G02B 2006/12107; G02B 2006/12104; G02B 6/2931; G02B 2006/12176; G02B 6/12007; G02B 6/29308; G02B 2006/01

USPC ..................................... 385/2–4, 14
See application file for complete search history.

(56) References Cited

U.S. PATENT DOCUMENTS

| 6,091,495 A * | 7/2000 | Ogawa ..................... G01J 9/02 356/450 |
| 2002/0181856 A1 | 12/2002 | Sappey et al. |

(Continued)

FOREIGN PATENT DOCUMENTS

KR   10-20140032212 A   3/2014

OTHER PUBLICATIONS

International Search Report and Written Opinion mailed Jul. 31, 2015, issued in corresponding International Application No. PCT/US2015/030184, 15 pages.

(Continued)

*Primary Examiner* — Akm Enayet Ullah
(74) *Attorney, Agent, or Firm* — Schwabe, Williamson & Wyatt, P.C.

(57) ABSTRACT

Embodiments of the present disclosure are directed toward techniques and configurations for an optical device having a semiconductor layer to propagate light and a mirror disposed inside the semiconductor layer and having echelle grating reflective surface to substantially totally internally reflect the propagating light inputted by one or more input waveguides, to be received by one or more output waveguides. The waveguides may be disposed in the semiconductor layer under a determined angle relative to the mirror reflective surface. The determined angle may be equal to or greater than a total internal reflection angle corresponding to the interface, to provide substantially total internal reflection of light by the mirror. The mirror may be formed by an interface of the semiconductor layer comprising the mirror reflective surface and another medium filling the mirror, such as a dielectric. Other embodiments may be described and/or claimed.

20 Claims, 11 Drawing Sheets

(51) Int. Cl.
*G02B 6/293* (2006.01)
*G02B 6/124* (2006.01)
*H04B 10/50* (2013.01)

(52) U.S. Cl.
CPC ............ *G02B6/2938* (2013.01); *H04B 10/501* (2013.01); *G02B 2006/121* (2013.01); *G02B 2006/12061* (2013.01); *G02B 2006/12097* (2013.01)

(56) References Cited

U.S. PATENT DOCUMENTS

| | | | |
|---|---|---|---|
| 2004/0119080 A1* | 6/2004 | Hashimoto | H01S 5/2231 257/85 |
| 2007/0086703 A1 | 4/2007 | Kirk et al. | |
| 2010/0296767 A1* | 11/2010 | Shimizu | G02F 1/2255 385/2 |
| 2011/0018024 A1* | 1/2011 | Fukshima | H01L 33/387 257/98 |
| 2011/0286700 A1 | 11/2011 | Feng et al. | |
| 2014/0086531 A1 | 3/2014 | Park et al. | |
| 2015/0063743 A1* | 3/2015 | Katou | G02F 1/0121 385/3 |
| 2015/0063809 A1* | 3/2015 | Sugiyama | H04J 14/06 398/65 |
| 2016/0018595 A1* | 1/2016 | Krishnamurthi | G02B 6/2931 385/14 |

OTHER PUBLICATIONS

W. Bogaerts et al., Silicon-on-insulator spectral filters f\bricated with CMOS Technology, J. Sel. Top Quantum Electron,16 (1), p. 33-44 (2010).

Folker Horst, et al., Silicon-on-insulator echelle grating WDM demultiplexers with two stigmatic points, Photonics Tech. Lett, 21, 1743 (2009).

"Fabrication Insensitive Echelle Grating in Silicon-on-Insulator Platform", D. Feng et al., IEEE Photonics Tech. Lett., vol. 23, 5, Mar. 2011.

Perfect Chirped Echelle grating wavelength Multiplexor: design and optimization, IEEE Photonics Jour., R. Lycett, D.F.G. Gallagher, V. Brulis, vol. 5, No. 2, Apr. 2013.

* cited by examiner

OPTICAL DEVICE USING ECHELLE GRATING THAT PROVIDES TOTAL INTERNAL REFLECTION OF LIGHT

This application is a continuation of U.S. patent application Ser. No. 14/334,260, filed Jul. 17, 2014, and entitled "OPTICAL DEVICE USING ECHELLE GRATING THAT PROVIDES TOTAL INTERNAL REFLECTION OF LIGHT." The entire disclosure of the foregoing application is incorporated in its entirety for all purposes by this reference.

FIELD

Embodiments of the present disclosure generally relate to the field of optoelectronics, and more particularly, to techniques and configurations for an optical device (e.g., multiplexor or demultiplexer) using echelle grating based on the total internal reflection principle and implemented on a silicon-on-insulator platform.

BACKGROUND

Optical multiplex or demultiplex devices based on echelle grating techniques have been used to realize multiplexing or demultiplexing of optical signals. Several approaches may be implemented to increase reflectivity of the grating surface in such devices and accordingly reduce optical loss. For example, metal may be deposited on the grating surface to enhance reflectivity. In another example, distributed Bragg reflector (DBR) mirrors may be fabricated behind the grating surface. In yet another example, straight grating facets may be replaced by corner mirror structures in the grating surface. However, these or similar approaches may be difficult to implement from a fabrication perspective and may cause implementation inaccuracy and integration problems, which may result in insufficient reflectivity increase.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
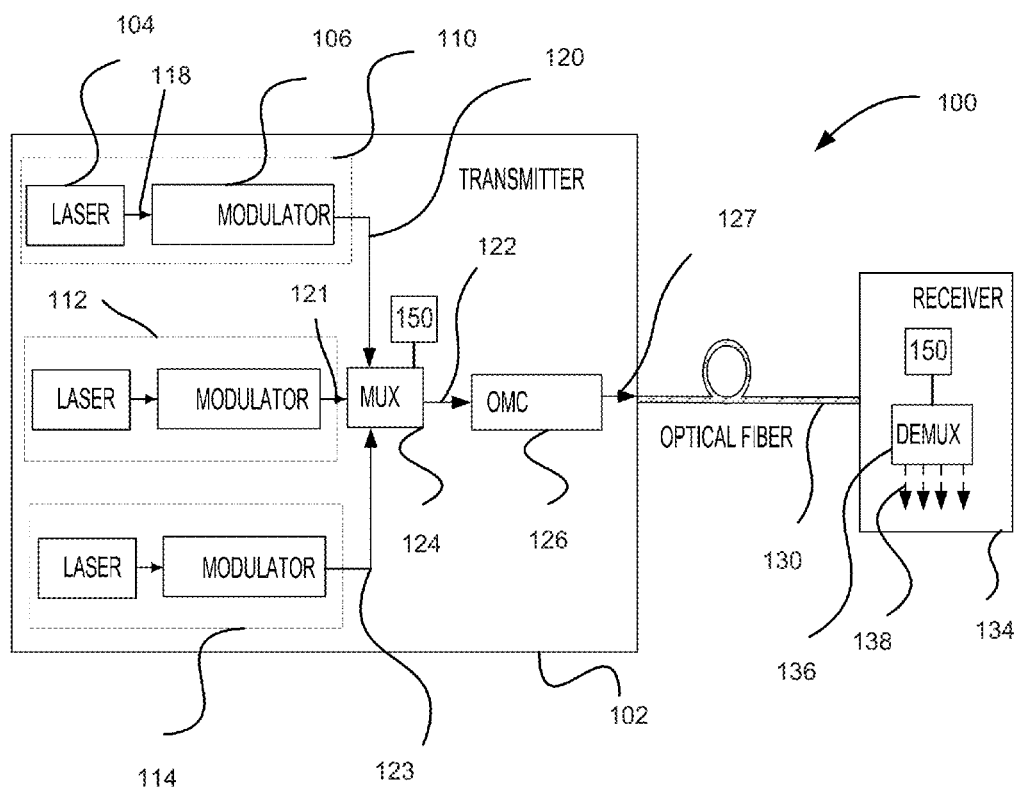
FIG. 1 is a block diagram of an optoelectronic system that may include a multiplexer and/or demultiplexer with a mirror having echelle grating configured to provide total internal reflection of light, in accordance with some embodiments.

Embodiments of the present disclosure describe techniques and configurations for an optical device having a semiconductor layer to propagate light from at least one light source and a mirror disposed inside the semiconductor layer and having echelle grating reflective surface to substantially totally internally reflect the propagating light inputted by one or more input waveguides, to be received by one or more output waveguides disposed inside the semiconductor layer. The mirror may be formed inside the semiconductor layer in a trench disposed in the layer. The mirror may be formed by an interface of two media: the semiconductor layer comprising the mirror reflective surface and another medium (e.g., air or dielectric material) that may fill the trench and may have a refractive index that is lower than that of the semiconductor layer, to provide the substantially total internal reflection of light by the mirror. The input and output waveguides may be disposed in the semiconductor layer under a determined angle relative to the mirror reflective surface, to provide substantially total internal reflection of light by the mirror. To enable the substantially total internal reflection, the determined angle of disposing the waveguides inside the semiconductor layer may be equal to or greater than a total internal reflection angle corresponding to the interface of the two media. The optical device may comprise a multiplexer or demultiplexer, due to the echelle grating effect of the mirror reflective surface.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

In various embodiments, the phrase "a first layer formed, deposited, or otherwise disposed on a second layer" may mean that the first layer is formed, deposited, grown, bonded, or otherwise disposed over the second layer, and at least a part of the first layer may be in direct contact (e.g., direct physical and/or electrical contact) or indirect contact (e.g., having one or more other layers between the first layer and the second layer) with at least a part of the second layer.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1 is a block diagram of an optoelectronic system 100 that may include a multiplexer and/or demultiplexer with a mirror having echelle grating configured to provide total internal reflection of light, in accordance with some embodiments. The optoelectronic system 100 may be used to transmit an optical signal modulated with a data signal via an optical fiber, for example, between racks in a data center, or long distance, between data storage facilities, data centers, and the like.

The optoelectronic system 100 may include an optical device such as transmitter 102 (e.g., photonic chip). The transmitter 102 may include one or more light sources (e.g., laser devices) 104 to provide a light signal 118 (e.g., constant light intensity signal) to a respective modulator 106 to modulate input light according to a data signal to be transmitted. Each combination of the light source 104 and corresponding modulator 106 may comprise a communication channel 110, 112, 114. Although three communication channels are shown, fewer or multiple more communication channels may be used in a transmitter such as 102, e.g., to provide a desired data transmission rate. The modulator 106 may output a modulated optical signal 120 to a multiplexer 124 having a mirror 150 with echelle grating providing a substantially total internal reflection of light as described herein. Similarly, communication channels 112, 114 may output modulated signals 121, 123 to the multiplexer 124. Signals 120, 121, 123 multiplexed from communication channels 110, 112, and 114 may be input as a combined signal 122 to an optical mode converter (e.g., coupler) 126.

The optical mode converter 126 may provide the interface from the multiplexer 124 with the mirror 150 on the photonic chip to an optical communication channel (e.g., optical fiber cable) 130 and is configured to transfer the combined optical signal 127 to the optical communication channel 130, to be received by a receiver 134. In embodiments, the receiver 134 may include a demultiplexer 136 having the mirror 150 with echelle grating providing a substantially total internal reflection of light as described herein. The demultiplexer 136 may be configured to demultiplex signal 127 into multiple signals 138, according to techniques described herein.

Figure 2:
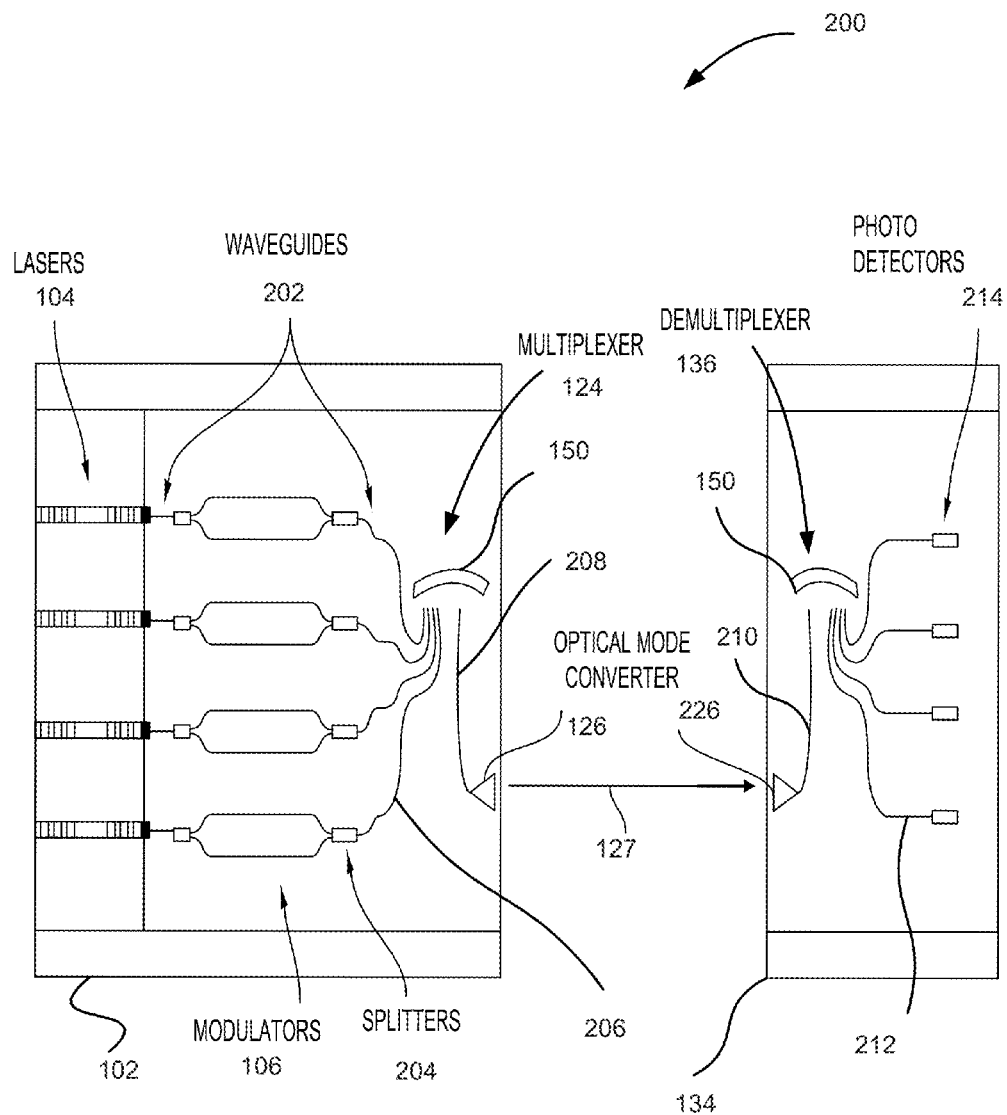
FIG. 2 is an example implementation of the optoelectronic system as an integrated photonics link, in accordance with some embodiments.

FIG. 2 is an example implementation of the optoelectronic system of FIG. 1 as an integrated photonics link 200, in accordance with some embodiments. Similar to the system 100 described above, the link 200 may include a transmitter 102 and receiver 134. The transmitter 102 may include multiple lasers 104 and waveguides 202 comprising modulators 106 and splitters 204. The optical signals generated by the lasers 104 may be provided through the waveguides 202 and splitters 204 to the mirror 150 of the multiplexer 124 with multiple input waveguides 206, according to wavelengths of each of the waveguides 206. The mirror 150 may substantially totally reflect the optical signals of different wavelengths and combine the signals due to the echelle grating effect of the mirror. An output waveguide 208 may receive the combined optical signal and transmit the optical signal to the optical mode converter 126. The optical mode converter 126 may provide the optical signal 127 converted from the combined optical signal to the receiver 134, to be converted by an optical mode converter 226 of the receiver 134. The converted optical signal may then be input into the demultiplexer 136 with the mirror 150 via the input waveguide 210. The mirror 150 may substantially totally reflect the optical signal, which may be split by wavelengths due to echelle grating effect of the mirror 150. The split portions of the signal may be received by multiple output waveguides 212 according to corresponding wavelengths of the waveguides 212. The portions of the output signal may be provided via the output waveguides 212 to photodetectors 214, to be further processed as desired. Various embodiments of the multiplexer 124 or demultiplexer 136 having the mirror 150 with echelle grating surface providing substantially total internal reflection of light will be described below in greater detail.

Figure 3:
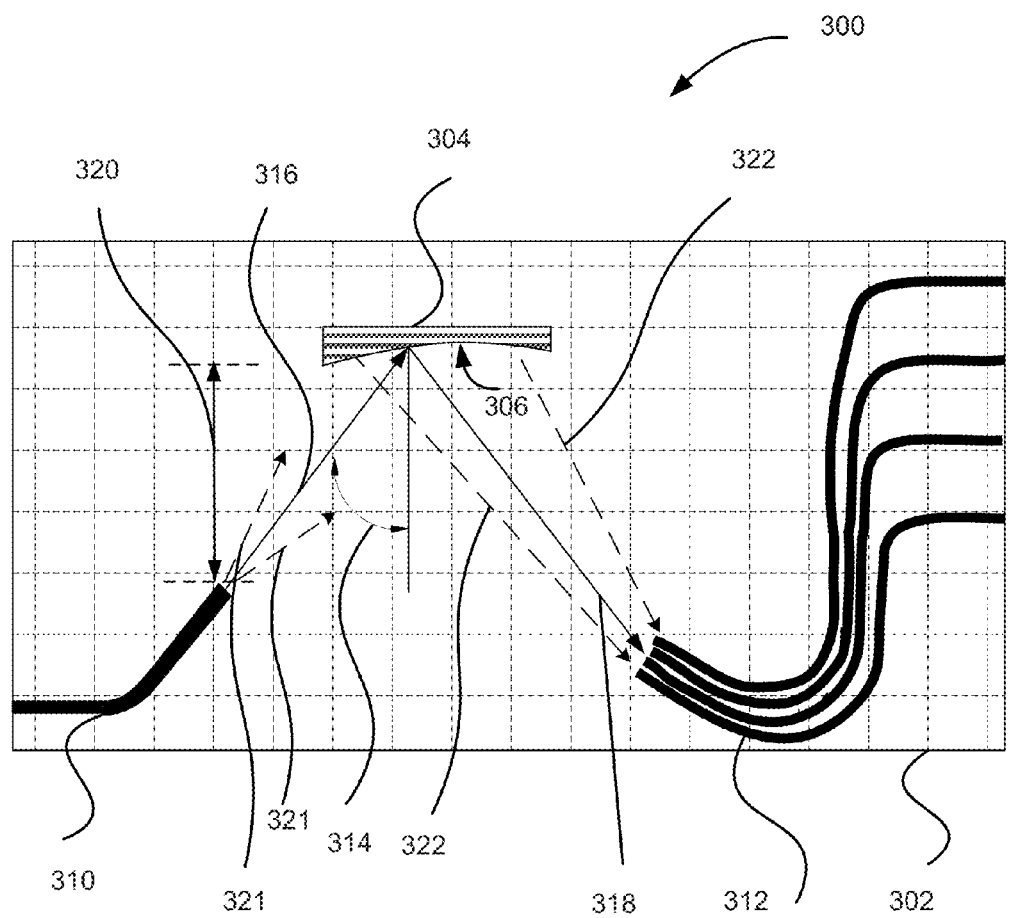
FIG. 3 illustrates an example top view of an optical device comprising a mirror with echelle grating surface configured to provide total internal reflection of light, in accordance with some embodiments.

FIG. 3 illustrates an example top view of an optical device 300 comprising a mirror with echelle grating surface configured to provide total internal reflection of light, in accordance with some embodiments. It will be appreciated that a multiplexer such as 124 or demultiplexer such as 136 may be implemented according to the embodiments described in reference to FIG. 3. For simplicity purposes, the optical device illustrated in FIG. 3 comprises a demultiplexer.

In some embodiments, the optical device 300 may be formed on a silicon-on-insulator (SOI) platform. Accordingly, the optical device 300 may formed in a semiconductor layer (e.g., comprising silicon) 302 or other silicon-based material. For example, in some embodiments, the semiconductor layer 302 may be provided on high index waveguide platforms, such as $Si_3N_4$ waveguide-buried oxide (BOX)-Si substrate, or SiON waveguide-BOX-Si substrate. The optical device may include a mirror 304 disposed inside the semiconductor layer 302, and having echelle grating reflective surface 306 to reflect light propagating inside the semiconductor layer 302. The optical device 300 may be configured such that the light propagating inside the semiconductor layer 302 may be confined in a vertical direction (e.g., by sandwiching the semiconductor layer 302 between dielectric layers as described in reference to FIGS. 8-13). The mirror 304 may be formed in a trench disposed in the semiconductor layer 302, as will be described below.

The reflective surface 306 of the mirror 304 may comprise a plurality of linear or curved micro-mirrors disposed on a substantially non-linear-shaped (e.g., curved) surface of the mirror 306, to provide constructive interference for the light directed at the mirror 304. The gratings may be constructed using various focusing geometries such as a Roland circle or ellipse. In a Roland circle, micro-mirror centers may be located about the circumference of a circle. In the elliptical disposition, micro-mirror centers may be determined based on the grating equation.

The mirror 304 may be formed by an interface of two media: the semiconductor layer 302 comprising the mirror reflective surface 306 and another medium (e.g., air or dielectric material) that may fill the trench in which the mirror 304 may be formed. That other medium may have a refractive index that is lower than that of the semiconductor layer 302, to provide the substantially total internal reflection of light by the mirror 304. For example, the trench disposed in the semiconductor layer 302 may be filled with a dielectric material, e.g., oxide. Accordingly, the refraction index of the semiconductor material may be greater than the refraction index of the dielectric material comprising the reflective surface 306 of the mirror 304, providing for a substantially total internal reflection (TIR) of light 316 directed at the mirror 304 by the input waveguide 310.

When light 316 enters the interface comprising one medium (e.g., semiconductor layer 302) and another medium (e.g., dielectric material filling the trench in which the mirror 304 is disposed), the amount of light transmitted and reflected may be determined by Fresnel equations. In other words, the reflectivity at the semiconductor-dielectric interface may be calculated as a function of the angle of incidence using Fresnel equations. For example, one may assume that the semiconductor layer 302 comprises silicon and the dielectric material comprises oxide. Because silicon has a higher refractive index (n Si=3.45) than oxide (n oxide=1.45), substantially total internal reflection of light may occur at an angle equal to or greater than 26 degrees, according to Fresnel calculations. Accordingly, substantially total amount of light 316 directed at the mirror 304 at an angle equal to or greater than the TIR angle (e.g., 26 degrees) may be reflected back into silicon (shown as reflected light 318).

The defined TIR angle between an interface of the two media (e.g., as described above, about 26 degrees for an interface between the semiconductor layer 302 and the dielectric material filling the trench in which the mirror 304 may be formed), may allow for a determination of the positions of the input waveguide(s) 310 and output waveguide(s) 312 inside the semiconductor layer 302. For example, the positions of the input and output waveguides 310 and 312 inside the semiconductor layer 302 may be selected such that an angle of incidence 314 of the light 316 directed at the echelle grating reflective surface 306 may be equal to or greater than the defined TIR angle corresponding to the interface of the two media.

The input and output waveguides 310 and 312 may be disposed at determined distances 320 from the reflective surface 306 of the mirror 304. Accordingly, when light 316 enters the semiconductor layer 302 from the input waveguide 310, it may be spatially dispersed within the silicon slab region (as indicated by arrows 321), then substantially totally reflected from the reflective surface 306 (as indicated by arrows 322), and refocused by the reflective surface 306 of the mirror 304 at the output waveguide 312 as indicated by 318.

If the optical device 300 comprises a demultiplexer, due to echelle grating effect of the reflective surface 306, portions of the reflected light 318 may be received by multiple output waveguides 312 according to their respective wavelengths. Similarly, if the optical device 300 comprises a multiplexer, due to echelle grating effect of the reflective surface 306, portions of the reflected light 318 may be received by the mirror 304 according to their respective wavelengths and reflected into the output waveguides 312 (indicated by reflected light 318).

As described above, the orientation of the waveguides 310, 312 may be defined such that the angle of incidence 314 on the surface 306 may be greater than the critical angle required for TIR. Depending on the type of the device 300 (e.g., multiplexer or demultiplexer), each of the input or output waveguides may correspond to a particular wavelength of inputted light (in a multiplexer) or reflected light (in a demultiplexer).

In summary, the described embodiments provide for substantially total internal reflection of light by the mirror 304 formed as described above, and for avoiding a deposition of additional reflective material (e.g., metal) on the reflective surface 306 of the mirror 304.

One of the design considerations for echelle grating reflective surface 306 configured to provide substantially total internal reflection of light as described above may be aberration correction. The term "aberration correction" may refer to the grating equation and not to the focusing properties of the system. In the echelle gratings with Rowland geometry, beams of light directed at the mirror 304 with large angles of incidence may require correction of the micro-mirror locations such that the path length difference for light reflected from adjacent micro-mirrors may satisfy the grating equation. In elliptical grating geometry, the aberration correction may not be needed because of the methodology adopted in grating construction. Input and output waveguides are placed at the foci of a series of ellipses. Therefore, grating equation and focusing properties of the optical device 300 may be tuned during the grating construction. The echelle grating may comprise a desired size footprint and may be implemented with integrated optoelectronic systems (e.g., system 100).

Figure 4:
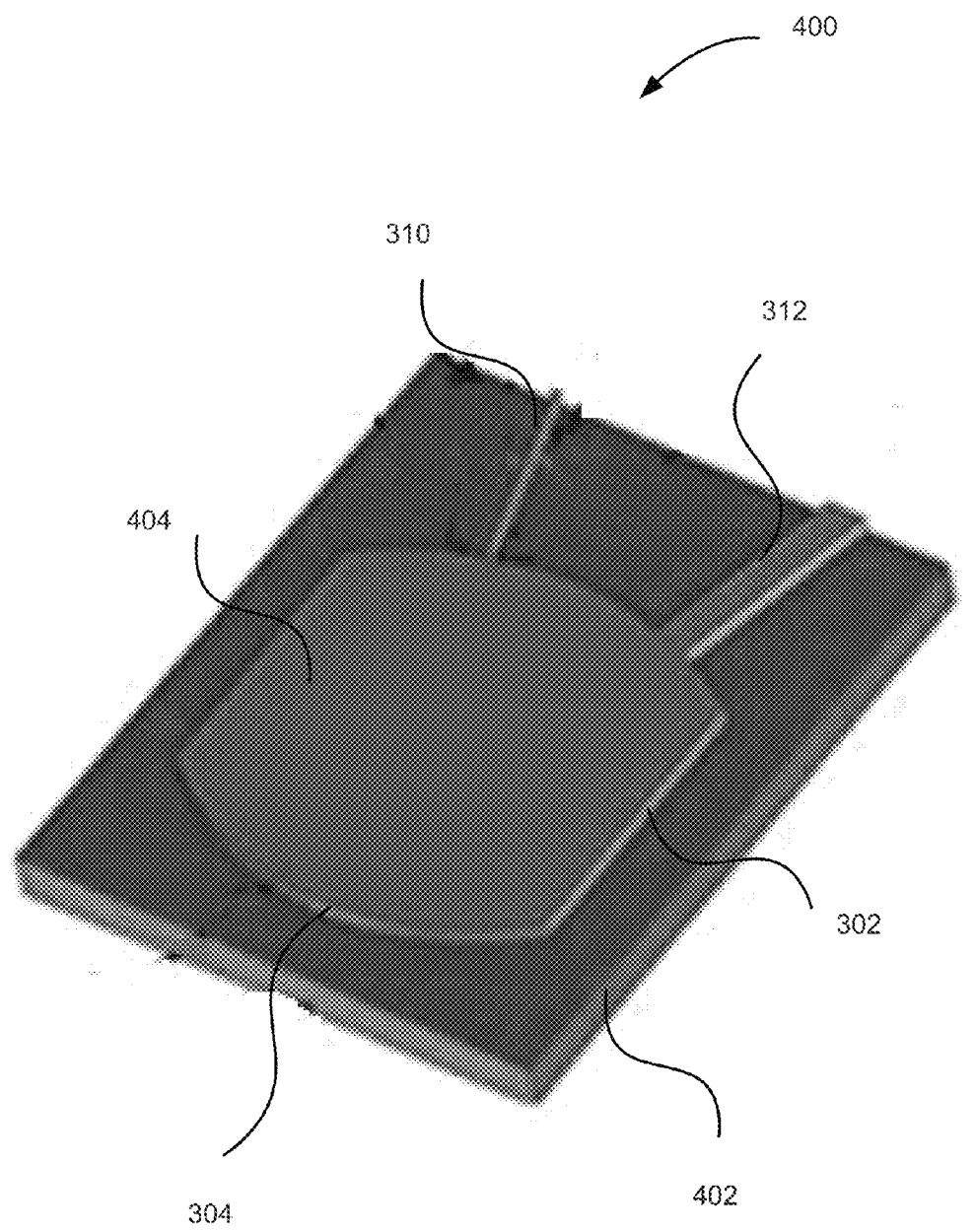
FIG. 4 illustrates a 3-dimensional view of an example optical device comprising a mirror with echelle grating surface configured to provide total internal reflection of light, in accordance with some embodiments.

FIG. 4 illustrates a 3-dimensional view of an example optical device 400 comprising a mirror with echelle grating surface configured to provide substantially total internal reflection of light, in accordance with some embodiments. The like components of the optical device 400 are numerated with like numerals in reference to FIG. 3. As shown, the optical device 400 may include the semiconductor layer 302 disposed on a buried oxide (BOX) layer 402. The optical device 400 may include the input waveguide 310 and multiple output waveguides 312 (in the instance of the optical device 400 comprising a demultiplexer). For illustrative purposes only, the semiconductor layer 302 is shown having a cut-out portion 404 in which light inputted by the input waveguide 310 may be dispersed before being reflected by the mirror 304 and further dispersed before being received by the output waveguides 312. One skilled in the art will appreciate that the semiconductor layer 302 may comprise a slab inside which the waveguides 310 and 312 may be etched and the mirror 304 formed as described in reference to FIG. 3. For example, the input and output waveguides 310 and 312 may comprise ribs etched inside the semiconductor layer 302.

Figure 5:
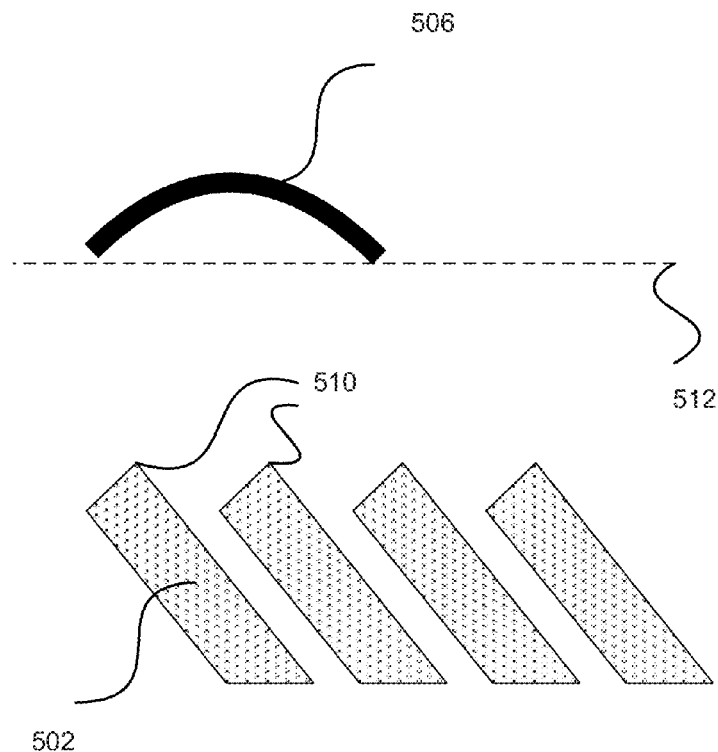
FIGS. 5 and 6 illustrate various embodiments of the waveguides' orientation in an optical device comprising a mirror with echelle grating surface configured to provide total internal reflection of light, in accordance with some embodiments.
Figure 6:
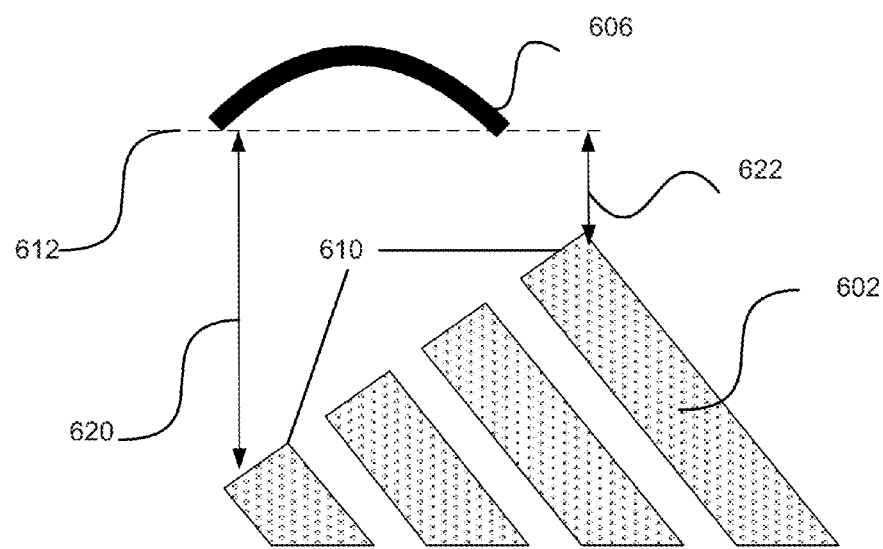

The orientation of the output/input waveguides of the optical device with respect to the echelle grating reflective surface of the mirror may contribute to reducing loss of light, e.g., insertion loss associated with the optical device. FIGS. 5 and 6 illustrate various embodiments of the waveguides' orientation in an optical device comprising a mirror with echelle grating surface configured to provide total internal reflection of light, in accordance with some embodiments. As illustrated in FIG. 5, waveguides 502 may have a horizontal orientation relative to a mirror 506. More specifically, the ends 510 of the waveguides 502 may be disposed substantially equidistantly relative to horizontal axis 512 linking the ends of the mirror 506.

In some embodiments, as illustrated in FIG. 6, waveguides 602 may have an angled orientation relative to a mirror 606. More specifically, the ends 610 of the waveguides 602 may be disposed at different distances (e.g., 620, 622) to horizontal axis 612 linking the ends of the mirror 606. In some embodiments, the angled orientation of the waveguides shown in FIG. 6 may provide lower light loss (e.g., insertion loss) than the horizontal orientation of the waveguides shown in FIG. 5.

Figure 7:
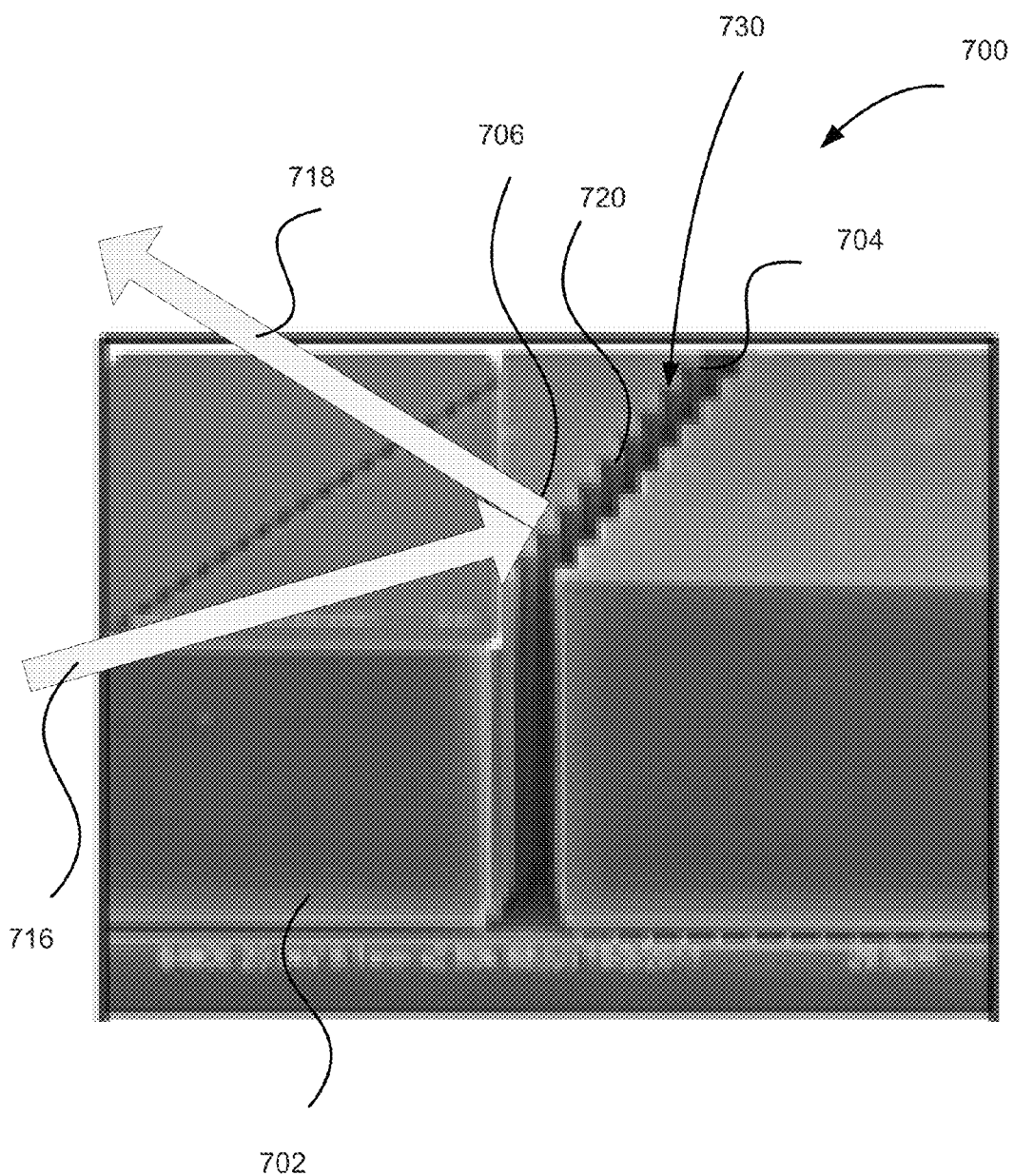
FIG. 7 is a photo image showing a zoomed 3-dimensional view of a portion of an example optical device comprising a mirror with echelle grating surface configured to provide total internal reflection of light, in accordance with some embodiments.

FIG. 7 is a photo image showing a zoomed 3-dimensional view of a portion 700 of an example optical device comprising a mirror with echelle grating surface configured to provide substantially total internal reflection of light, in accordance with some embodiments. As shown in the photo image, the portion 700 may include a semiconductor layer 702 having a trench 704 disposed in the layer 702. The trench 704 may have echelle grating 706 provided on at least one facet 720 of the trench 704 to form a mirror 730 in accordance with embodiments described herein. In order to achieve substantially right corners and substantially vertical sidewalls of the grating 706 surfaces, a two-layer hard mask (e.g., comprising about 300 nanometers of $Si_3N_4$ and about 2 micrometers of $SiO_2$) may be used as described in reference to FIGS. 8-13 in greater detail.

The light 716 provided from an input waveguide(s) (not shown) placed under an incident angle equal to or greater than the TIR angle relative to the trench 704 may be substantially totally reflected by the mirror 730 formed in the trench 704 to form a reflected light 718, providing multiplexing or demultiplexing of the light 716 depending on a desired type of the optical device. As described above, the trench 704 may be filled with another medium, such as air or dielectric material, to provide the desired TIR effect.

FIGS. 8-13 schematically illustrate cross-section side views of an example optical device configured with an echelle grating mirror providing a substantially total reflection of light, showing different stages of forming the optical device structure, in accordance with some embodiments. More specifically, FIGS. 8-13 illustrate the example fabrication operations adapted to form the device structure based on an SOI platform, in accordance with some embodiments. The numerals used in FIGS. 8-13 reference some of the components of the optical device 300 described in reference to FIG. 3. For simplicity purposes, the structure components (e.g., layers of the structure) of the optical device that appear in multiple figures will be described and numbered in the first figure in which they appear and will be referenced in subsequent figures.

Figure 8:
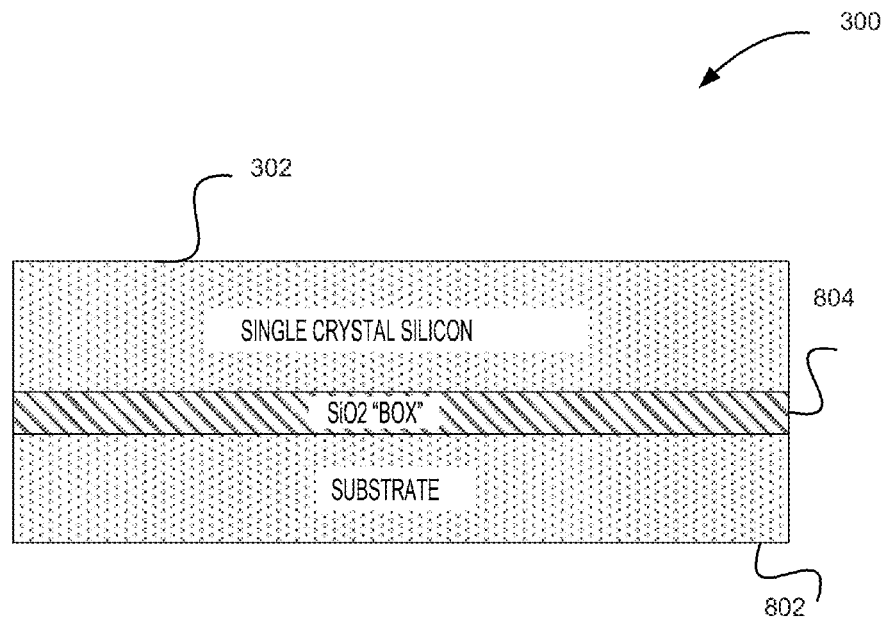
FIGS. 8-13 schematically illustrate cross-section side views of an example optical device configured with an echelle grating mirror providing a substantially total reflection of light, showing different stages of forming the optical device structure, in accordance with some embodiments.

Referring to FIG. 8, the device 300 is depicted subsequent to providing a substrate (e.g., silicon substrate) 802 with a buried oxide (BOX) layer 804 (e.g., 1 micrometer $SiO_2$) disposed on top of the substrate 802, and depositing a semiconductor (e.g., 0.2 or 30 micrometer crystal silicon) layer 302 on the BOX layer 804. The substrate 802, BOX layer 804, and semiconductor layer 302 may comprise an SOI wafer.

Figure 9:
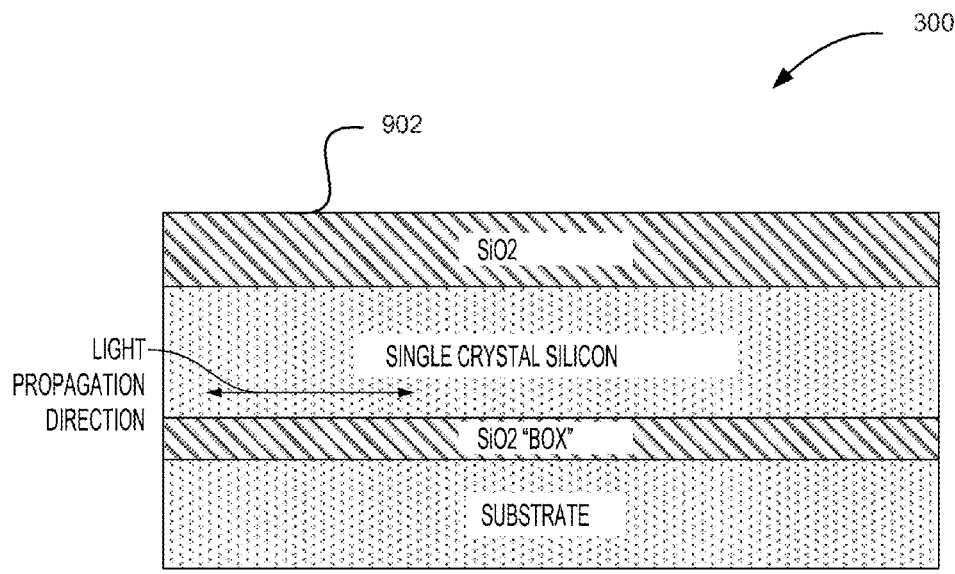

In FIG. 9, the device 300 is depicted subsequent to a deposition of a first layer of a two-layered hard mask provided for subsequent etching the semiconductor layer 302 to form the mirror with echelle grating reflective surface and/or input and output waveguides described in reference to FIG. 3. The hard mask may be provided in a dielectric layer 902 (e.g., 1 micrometer $SiO_2$) that may be deposited on top of the semiconductor layer 302. In some embodiments, the dielectric layer 902 may comprise silicon dioxide ($SiO_2$), silicon nitride ($Si_3N_4$), aluminum trioxide ($Al_2O_3$), hafnium dioxide ($HfO_2$), or other suitable materials. The light propagating inside the semiconductor layer 302 may be confined in a vertical direction, by having the semiconductor layer 302 be sandwiched between the layers 804 and 902.

Figure 10:
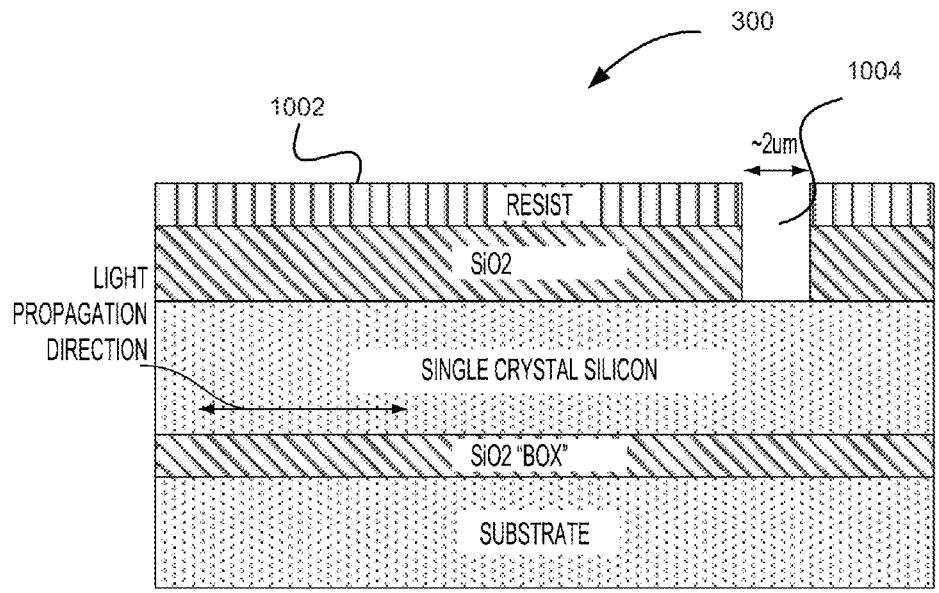

In FIG. 10, the device 300 is depicted subsequent to depositing a photoresist layer 1002 (e.g., $Si_3N_4$) on top of the dielectric layer 902 and patterning the hard mask using lithography (e.g., high resolution lithography). The pattern may define a trench 1004 extending into the dielectric layer 902. For example, the trench 1004 may have a width of about 2 micrometers. As described in reference to FIG. 3, the mirror 304 may be formed inside the trench 1004.

Figure 11:
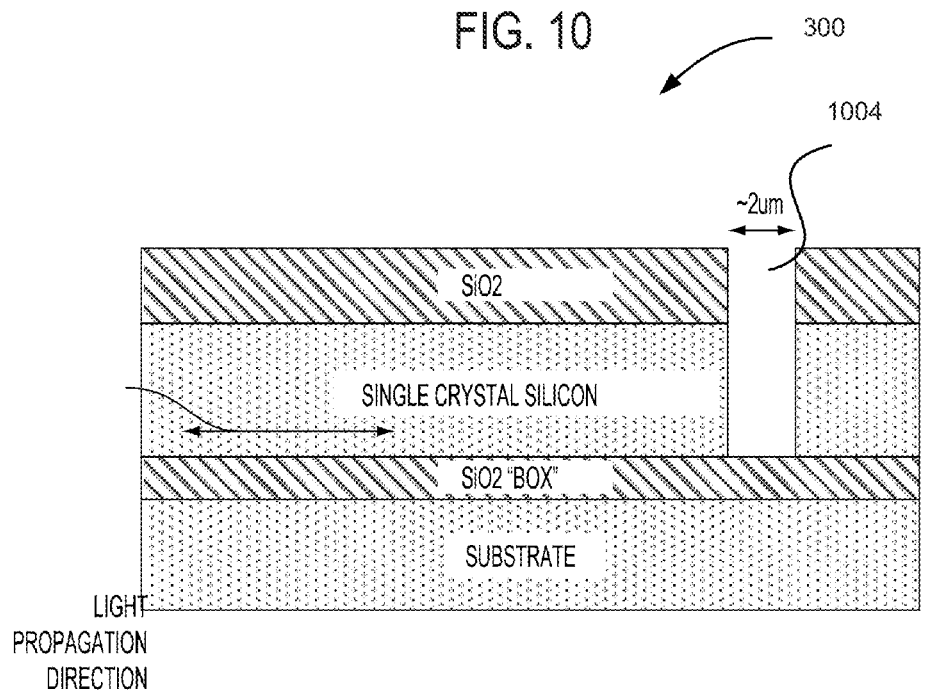
Figure 12:
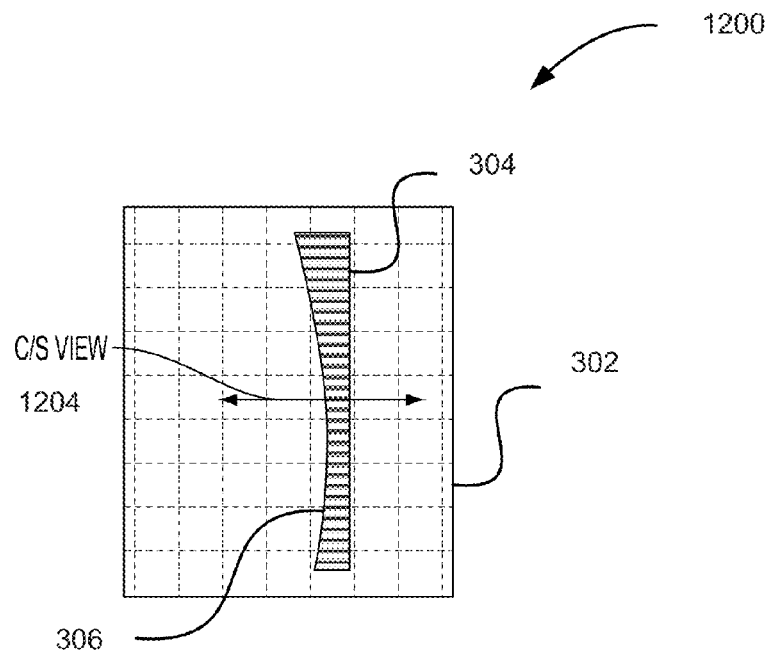

In FIG. 11, the device 300 is depicted subsequent to stripping the photoresist layer 1002 and dry etching semiconductor layer 302, to form the trench 1004 inside the semiconductor layer 302, and form the echelle grating reflected surface on at least one facet of the trench 1004. The top view 1200 of the trench 1004 comprising the mirror 304 etched inside the semiconductor layer 302 is illustrated in FIG. 12. Line 1204 indicates a cross-sectional view of the trench 1004 as it is depicted in FIG. 11. As shown, the echelle grating reflective surface 306 of the mirror 304 may have a non-linear, e.g., curved shape.

Figure 13:
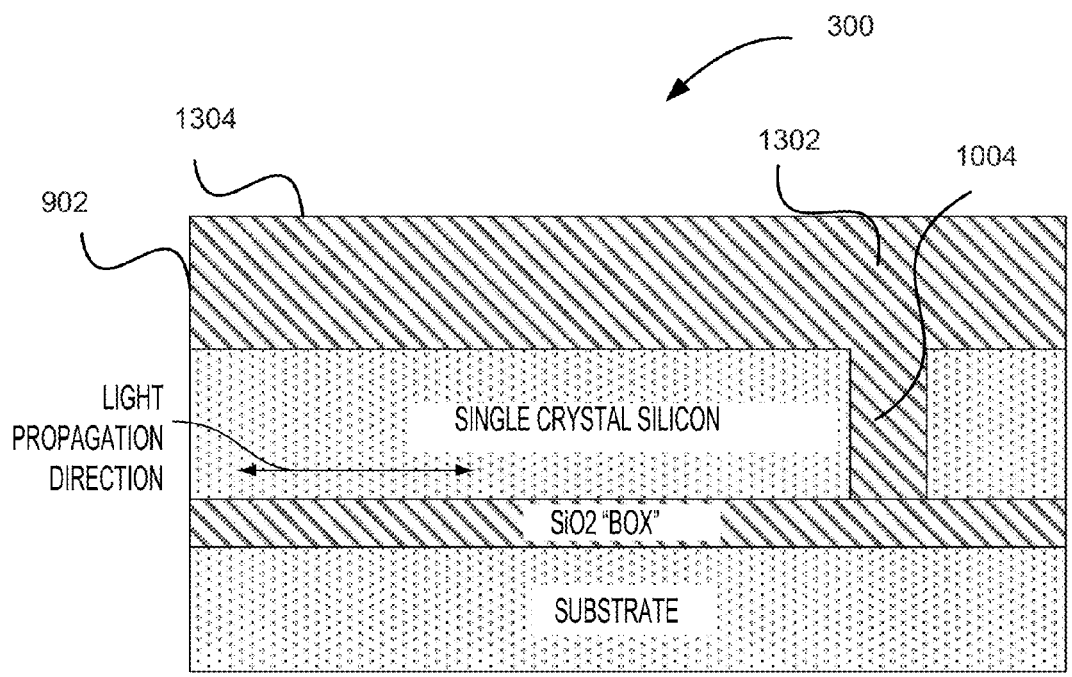

In FIG. 13, the device 300 is depicted subsequent to depositing, or otherwise disposing, a dielectric material 1302 (e.g., high aspect ratio silicon oxide $SiO_2$) on top of the dielectric layer 902 to fill the trench 1004, and polishing a surface 1304 of the device 300 to remove excess of the dielectric material 1302 from the dielectric layer 902.

Figure 14:
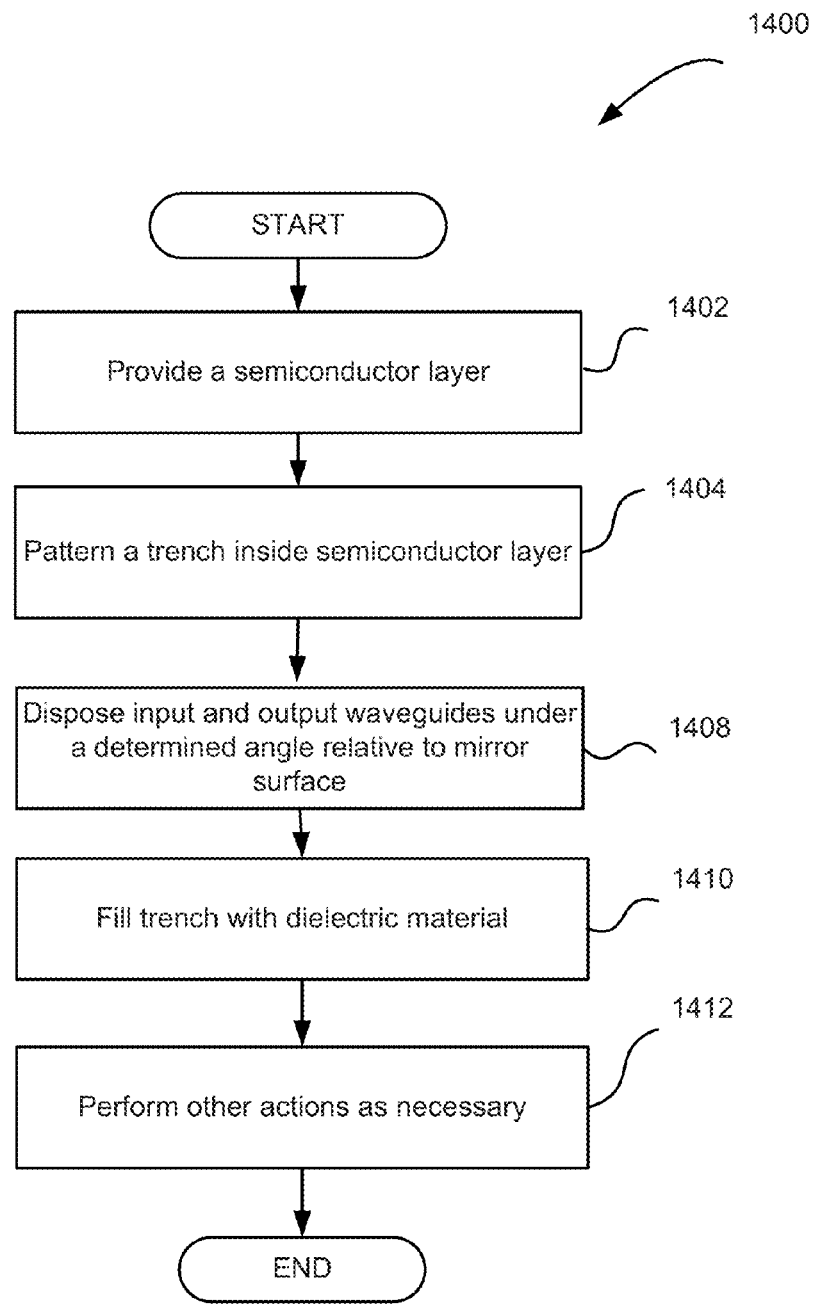
FIG. 14 is a flow diagram for a process of fabricating an optical device comprising a mirror with echelle grating surface configured to provide total internal reflection of light, using a semiconductor-dielectric-semiconductor structure, in accordance with some embodiments.

FIG. 14 is a flow diagram for a process 1400 of fabricating an optical device comprising a mirror with echelle grating surface configured to provide total internal reflection of light, using a semiconductor-dielectric-semiconductor structure (e.g., the device 300 of FIG. 3), in accordance with some embodiments. The process 1400 may comport with actions described in connection with FIGS. 8-13 in some embodiments.

At 1402, the process 1400 may include forming a semiconductor layer on a substrate provided for fabricating the device 300 and other actions directed at providing an SOI structure.

At 1404, the process 1400 may further include patterning a trench inside the semiconductor layer, similar to the actions described in reference to FIGS. 10-11. More specifically, the process 1404 may include patterning the trench with echelle grating reflective surface on a facet of the trench with such orientation to the waveguide that provides fulfilling the substantially total internal reflection of light condition, similar to the actions described in reference to FIGS. 10-11. For example, a hard mask may be used for forming the trench and echelle grating. In other words, the process in detail may include disposing a trench inside the semiconductor layer and etching echelle grating reflective surface on a facet of the trench to form a mirror to reflect light propagating through the semiconductor layer.

At 1408, the process 1400 may further include disposing input and output waveguides under a determined angle relative to the mirror surface, as described in reference to FIGS. 10-11.

At 1410, the process 1400 may further include filling the trench with a medium such as a dielectric material having a refractive index that is lower than that of the semiconductor layer, to provide the substantially total internal reflection of light by the mirror, after etching echelle grating reflective surface, as described in reference to FIG. 13.

At 1412, the process 1400 may further include optionally, alternatively, or additionally to the actions performed at 1402-1410, performing other actions as necessary. For example, the actions may include disposing a photoresist layer on top of the dielectric layer with a hard mask of the reflective surface, conducting lithographic patterning and hard mask etching, dry etching the semiconductor layer using the hard mask to produce the reflective surface, and/or other actions described in reference to FIGS. 8-13.

The optical device 300 (e.g., multiplexer or demultiplexer) formed as a result of the operations described above may be configured to receive light inputted from a light source via one or more input waveguides (depending on a type of the optical device) and substantially totally internally reflect the light using the echelle grating surface of the mirror formed in the semiconductor layer of the device 300, to be received and propagated by one or more output waveguides (depending on a type of the optical device). The waveguides may be disposed in the semiconductor layer under a determined angle (e.g., equal to or greater than the TIR angle between the two media comprising the mirror) relative to the mirror surface, to provide for substantially total internal reflection of light.

Various operations related to FIGS. 8-14 are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Figure 15:
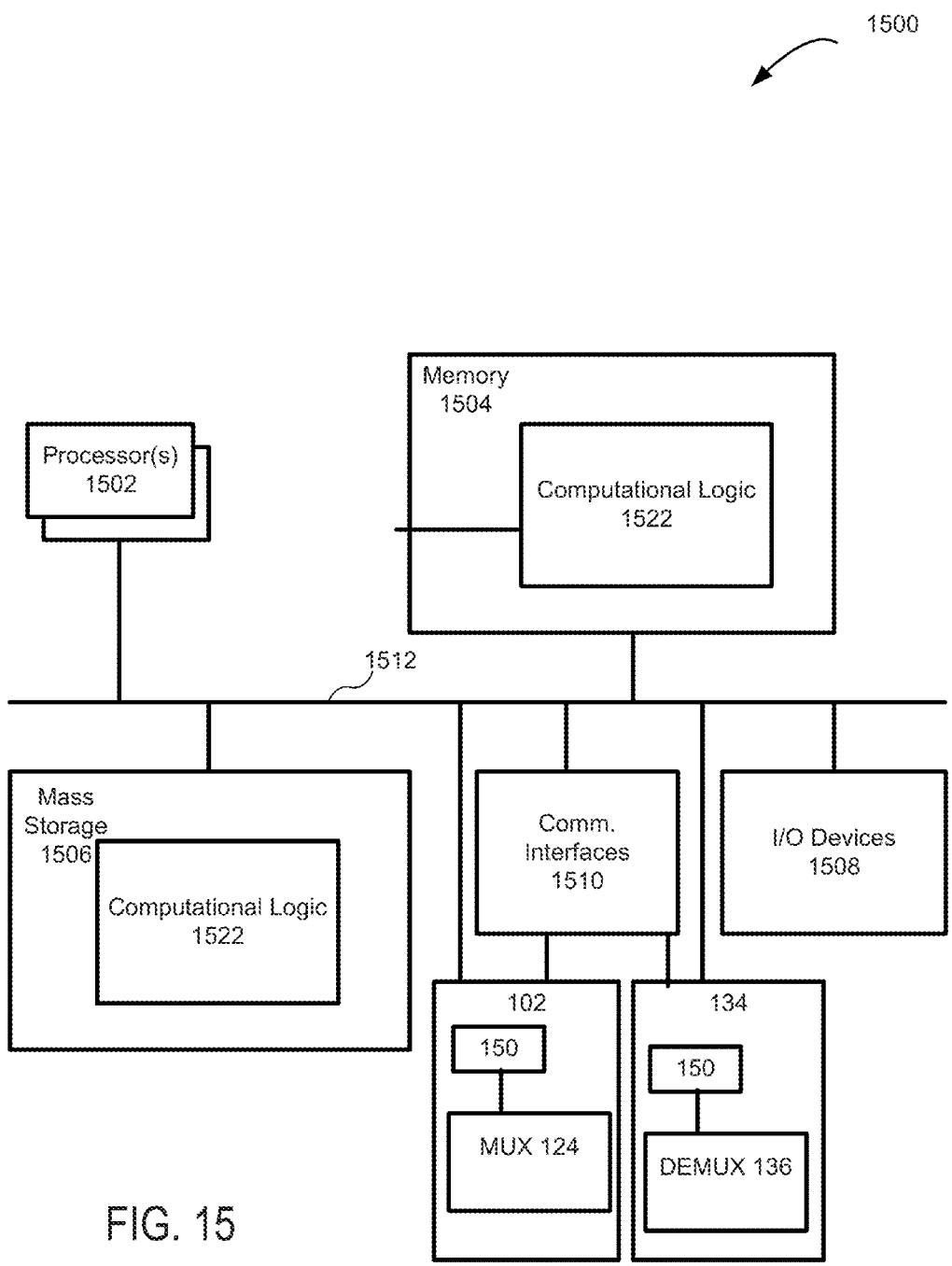
FIG. 15 illustrates an example computing device suitable for use with various components of an optoelectronic system, such as a transmitter having the multiplexer with the echelle grating mirror and/or receiver having the demultiplexer with the mirror, in accordance with various embodiments.

FIG. 15 illustrates an example computing device 1500 suitable for use with various components of FIG. 1, such as optoelectronic system 100 including transmitter 102 having the multiplexer 124 with the echelle grating mirror 150 and/or receiver 134 having the demultiplexer 136 with the mirror 150, in accordance with various embodiments. As shown, computing device 1500 may include one or more processors or processor cores 1502 and system memory 1504. For the purpose of this application, including the claims, the terms "processor" and "processor cores" may be considered synonymous, unless the context clearly requires otherwise. The processor 1502 may include any type of processors, such as a central processing unit (CPU), a microprocessor, and the like. The processor 1502 may be implemented as an integrated circuit having multi-cores, e.g., a multi-core microprocessor. The computing device 1500 may include mass storage devices 1506 (such as diskette, hard drive, volatile memory (e.g., dynamic random-access memory (DRAM), compact disc read-only memory (CD-ROM), digital versatile disk (DVD), and so forth). In general, system memory 1504 and/or mass storage devices 1506 may be temporal and/or persistent storage of any type, including, but not limited to, volatile and non-volatile memory, optical, magnetic, and/or solid state mass storage, and so forth. Volatile memory may include, but is not limited to, static and/or dynamic random-access memory. Non-volatile memory may include, but is not limited to, electrically erasable programmable read-only memory, phase change memory, resistive memory, and so forth.

The computing device 1500 may further include input/output (I/O) devices 1508 (such as a display (e.g., a touchscreen display), keyboard, cursor control, remote control, gaming controller, image capture device, and so forth) and communication interfaces 1510 (such as network interface cards, modems, infrared receivers, radio receivers (e.g., Bluetooth), and so forth). In some embodiments, the communication interfaces 1510 may include or otherwise be coupled with the transmitter 102 having the multiplexer 124 with the echelle grating mirror 150 and/or receiver 134 having the demultiplexer 136 with the mirror 150 as described herein, in accordance with various embodiments.

The communication interfaces 1510 may include communication chips (not shown) that may be configured to operate the device 1500 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 1510 may operate in accordance with other wireless protocols in other embodiments.

The above-described computing device 1500 elements may be coupled to each other via system bus 1512, which may represent one or more buses. In the case of multiple buses, they may be bridged by one or more bus bridges (not shown). Each of these elements may perform its conventional functions known in the art. In particular, system memory 1504 and mass storage devices 1506 may be employed to store a working copy and a permanent copy of the programming instructions for the operation of the transmitter 102 of FIG. 1. The various elements may be implemented by assembler instructions supported by processor(s) 1502 or high-level languages that may be compiled into such instructions.

The permanent copy of the programming instructions may be placed into mass storage devices 1506 in the factory, or in the field, through, for example, a distribution medium (not shown), such as a compact disc (CD), or through communication interface 1510 (from a distribution server (not shown)). That is, one or more distribution media having an implementation of the agent program may be employed to distribute the agent and to program various computing devices.

The number, capability, and/or capacity of the elements 1508, 1510, 1512 may vary, depending on whether computing device 1500 is used as a stationary computing device, such as a set-top box or desktop computer, or a mobile computing device, such as a tablet computing device, laptop computer, game console, or smartphone. Their constitutions are otherwise known, and accordingly will not be further described.

In embodiments, memory 1504 may include computational logic 1522 configured to practice aspects of embodiments, such as operation of the transmitter 102 and/or receiver 134, as described in reference to FIGS. 1 and 3-13.

For one embodiment, at least one of processors 1502 may be packaged together with computational logic 1522 configured to practice aspects of optical signal transmission and receipt described herein to form a System in Package (SiP) or a System on Chip (SoC).

The computing device 1500 may include or otherwise be associated with an optoelectronic system, such as system 100 implementing aspects of the transmitter 102 and/or receiver 134, including the multiplexer 124 and/or demultiplexer 136 as described above. In some embodiments, at least some components of the optoelectronic system 100 (e.g., transmitter 102 and/or receiver 134) may be communicatively coupled with the computing device 1500 and/or be included in one or more of the computing device 1500 components, such as communication interfaces 1510, for example.

In various implementations, the computing device 1500 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 1500 may be any other electronic device that processes data.

According to various embodiments, the present disclosure describes a number of examples. Example 1 is an optical apparatus comprising: a semiconductor layer to propagate light from at least one light source; a mirror disposed inside the semiconductor layer, and having echelle grating reflective surface to reflect and refocus the propagating light; at least one input optical waveguide disposed inside the semiconductor layer to spatially disperse the propagating light onto the mirror; and at least one output optical waveguide disposed inside the semiconductor layer to receive at least a portion of light reflected by the mirror, wherein the input and output optical waveguides are disposed under a determined angle relative to the mirror reflective surface, to provide substantially total internal reflection of light by the mirror.

Example 2 may include the subject matter of Example 1, and further specifies that the mirror is formed in a trench disposed in the semiconductor layer.

Example 3 may include the subject matter of Example 2, and further specifies that the mirror reflective surface is etched on at least one facet of the trench.

Example 4 may include the subject matter of Example 3, and further specifies that the trench is filled with a medium having a refractive index that is lower than that of the semiconductor layer, to provide the substantially total internal reflection of light by the mirror formed by an interface of the semiconductor layer and the medium.

Example 5 may include the subject matter of Example 4, and further specifies that the determined angle is equal to or greater than a total internal reflection angle corresponding to the interface of the semiconductor layer and the medium.

Example 6 may include the subject matter of Example 5, and further specifies that the medium comprises a dielectric material.

Example 7 may include the subject matter of Example 6, and further specifies that the semiconductor layer comprises silicon (Si) or other silicon-based material and the dielectric material is selected from at least one of: air, silicon dioxide ($SiO_2$), silicon nitride ($Si_3N_4$), aluminum trioxide ($Al_2O_3$), or hafnium dioxide ($HfO_2$).

Example 8 may include the subject matter of Example 3, and further specifies that the reflective surface is disposed on the at least one facet of the trench and comprises a substantially non-linear shape having a plurality of linear or curved micro-mirrors disposed around the reflective surface.

Example 9 may include the subject matter of Example 2, and further specifies that the optical apparatus further comprises: a substrate; a buried oxide (BOX) layer disposed above the substrate, wherein the semiconductor layer is disposed on the BOX layer; and a dielectric layer disposed above the semiconductor layer, to confine the light propagating inside the semiconductor layer; wherein the trench extends through the dielectric layer into the semiconductor layer.

Example 10 may include the subject matter of Example 1, and further specifies that the light source is optically coupled with the apparatus and comprises a laser.

Example 11 may include the subject matter of Example 1, and further specifies that the input and output waveguides comprise ribs etched inside the semiconductor layer.

Example 12 may include the subject matter of Example 11, and further specifies that the input and output waveguides have respective first ends to receive light from the light source and second ends to focus received light on the mirror, wherein the second ends are disposed within respective determined distances from the reflective surface of the mirror.

Example 13 may include the subject matter of Examples 1 to 12, and further specifies that the at least one input waveguide comprises two or more waveguides, wherein each input waveguide corresponds to a determined wavelength, wherein the at least one output waveguide comprises one waveguide, and wherein the optical apparatus comprises a multiplexer.

Example 14 may include the subject matter of Examples 1 to 12, and further specifies that the at least one output waveguide comprises two or more waveguides, wherein each output waveguide corresponds to a determined wavelength, wherein the at least one input waveguide comprises one waveguide, and wherein the optical apparatus comprises a demultiplexer.

Example 15 is an optical communication system comprising at least one optical apparatus, wherein the optical apparatus includes: a semiconductor layer to propagate light from at least one light source; a mirror disposed inside the semiconductor layer, and having echelle grating reflective surface to reflect and refocus the propagating light; at least one input optical waveguide disposed inside the semiconductor layer to direct the propagating light into the mirror; and at least one output optical waveguide disposed inside the semiconductor layer to receive at least a portion of light reflected by the mirror, wherein the input and output optical waveguides are disposed under a determined angle relative to the mirror reflective surface, to provide substantially total internal reflection of light by the mirror.

Example 16 may include the subject matter of Example 15, and further specifies that the system comprises an optical transmitter that includes the optical apparatus, wherein the at least one input waveguide comprises two or more waveguides, wherein each input waveguide corresponds to a determined wavelength, wherein the at least one output waveguide comprises one waveguide, and wherein the optical apparatus comprises a multiplexer.

Example 17 may include the subject matter of Example 15, and further specifies that the system further comprises an optical receiver that includes the optical apparatus, wherein the at least one output waveguide comprises two or more waveguides, wherein each output waveguide corresponds to a determined wavelength, wherein the at least one input waveguide comprises one waveguide, and wherein the optical apparatus comprises a demultiplexer.

Example 18 may include the subject matter of Examples 15 to 17, and further specifies that the mirror is formed in a trench disposed in the semiconductor layer, wherein the trench is filled with a dielectric having a refractive index that is lower than that of the semiconductor layer, to provide for the substantially total internal reflection of light by the mirror, wherein the reflective surface comprises a plurality of linear or curved micro-mirrors disposed on at least one facet of the trench.

Example 19 is a method for providing an optical apparatus, comprising: providing a semiconductor layer; disposing a trench inside the semiconductor layer; etching echelle grating reflective surface on a facet of the trench to form a mirror to reflect light propagating through the semiconductor layer; and disposing at least one input optical waveguide to direct the propagating light into the mirror and at least one output optical waveguide to receive at least a portion of light reflected by the mirror inside the semiconductor layer, under a determined angle relative to the mirror reflective surface, to provide substantially total internal reflection of light by the mirror.

Example 20 may include the subject matter of Example 19, and further specifies that providing a semiconductor layer comprises: providing a substrate; disposing a buried oxide (BOX) layer above the substrate; and disposing the semiconductor layer on the BOX layer.

Example 21 may include the subject matter of Example 20, and further specifies that the method further comprises disposing a dielectric layer above the semiconductor layer, to confine the light propagating inside the semiconductor layer, wherein disposing the trench includes extending the trench through the dielectric layer.

Example 22 may include the subject matter of Example 21, and further specifies that the method further comprises filling the trench with a dielectric material having a refractive index that is lower than that of the semiconductor layer, to provide the substantially total internal reflection of light by the mirror, after etching echelle grating reflective surface.

Example 23 may include the subject matter of Example 22, and further specifies that the determined angle is equal to or greater than a total internal reflection angle between the semiconductor and dielectric layers Example 24 may include the subject matter of Example 21, and further specifies that etching echelle grating reflective surface includes: disposing a photoresist layer on top of the dielectric layer with a hard mask of the reflective surface; and dry etching the semiconductor layer using the hard mask to produce the reflective surface.

Example 25 may include the subject matter of Example 24, and further specifies that etching echelle grating reflective surface further includes: etching a plurality of linear or curved micro-mirrors on at least one facet of the trench formed inside the semiconductor layer.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

What is claimed is:

1. An optical apparatus comprising:
   a semiconductor layer to propagate light from at least one light source;
   a mirror having an echelle grating reflective surface that is provided on a facet of a trench substantially disposed inside the semiconductor layer, to reflect and refocus the propagating light;
   at least one input optical waveguide disposed inside the semiconductor layer to spatially disperse the propagating light onto the mirror; and
   at least one output optical waveguide disposed inside the semiconductor layer to receive at least a portion of light reflected by the mirror,
   wherein the input and output optical waveguides are disposed under a determined angle relative to the mirror reflective surface, to provide substantially total internal reflection of light by the mirror, and wherein at least one of the at least one of the input and output optical waveguides is disposed at a determined distance from the mirror reflective surface, to reduce loss of light.

2. The optical apparatus of claim 1, wherein the at least one input waveguide comprises a plurality of waveguides, wherein each input waveguide corresponds to a determined wavelength, wherein the determined distance comprises distance or distances at which respective waveguides of the plurality of waveguides are disposed from the reflective surface of the mirror, wherein the at least one output waveguide comprises one waveguide, and wherein the optical apparatus comprises a multiplexer.

3. The optical apparatus of claim 2, wherein respective ends of the waveguides of the plurality of waveguides are disposed substantially equidistantly relative to an imaginary axis that links a first end and a second end of the reflective surface of the mirror.

4. The optical apparatus of claim 2, wherein respective ends of the waveguides of the plurality of waveguides are disposed along an imaginary line that forms an angle with an imaginary axis that links a first end and a second end of the reflective surface of the mirror.

5. The optical apparatus of claim 1, wherein the at least one output waveguide comprises a plurality of waveguides, wherein each output waveguide corresponds to a determined wavelength, wherein the determined distance comprises distance or distances at which respective waveguides of the plurality of waveguides are disposed from the reflective surface of the mirror, wherein the at least one input waveguide comprises one waveguide, and wherein the optical apparatus comprises a demultiplexer.

6. The optical apparatus of claim 5, wherein respective ends of the waveguides of the plurality of waveguides are disposed substantially equidistantly relative to an imaginary axis that links a first end and a second end of the reflective surface of the mirror.

7. The optical apparatus of claim 5, wherein respective ends of the waveguides of the plurality of waveguides are disposed along an imaginary line that forms an angle with an imaginary axis that links a first end and a second end of the reflective surface of the mirror.

8. The optical apparatus of claim 1, wherein the trench is filled with a medium having a refractive index that is lower than that of the semiconductor layer, to provide the substantially total internal reflection of light by the mirror formed by an interface of the semiconductor layer and the medium.

9. The optical apparatus of claim 1, wherein the semiconductor layer comprises silicon (Si) or other silicon-based material and a dielectric material is selected from at least one of: air, silicon dioxide ($SiO_2$), silicon nitride ($Si_3N_4$), aluminum trioxide ($Al_2O_3$), or hafnium dioxide ($HfO_2$).

10. The optical apparatus of claim 1, wherein the reflective surface comprises a substantially non-linear shape having a plurality of linear or curved micro-mirrors disposed around the reflective surface.

11. The optical apparatus of claim 1, further comprising:
a substrate;
a buried oxide (BOX) layer disposed above the substrate, wherein the semiconductor layer is disposed on the BOX layer; and
a dielectric layer disposed above the semiconductor layer, to confine the light propagating inside the semiconductor layer;
wherein the trench extends through the dielectric layer into the semiconductor layer.

12. The optical apparatus of claim 1, wherein the input and output waveguides comprise ribs etched inside the semiconductor layer.

13. An apparatus, comprising:
a processor; and
an optical device coupled with the processor to transmit data provided by the processor or to receive data to be provided to the processor, wherein the optical device comprises: a semiconductor layer to propagate light generated by a light source, wherein the generated light carries the data in a form of optical signals; a mirror having an echelle grating reflective surface that is provided on a facet of a trench substantially disposed inside the semiconductor layer, to reflect and refocus the propagating light; at least one input optical waveguide disposed inside the semiconductor layer to spatially disperse the propagating light onto the mirror; and at least one output optical waveguide disposed inside the semiconductor layer to receive at least a portion of light reflected by the mirror,
wherein the input and output optical waveguides are disposed under a determined angle relative to the mirror reflective surface, to provide substantially total internal reflection of light by the mirror, and wherein at least one of the at least one of the input and output optical waveguides is disposed at a determined distance from the mirror reflective surface, to reduce loss of light.

14. The apparatus of claim 13, wherein the at least one input waveguide comprises a plurality of waveguides, wherein each input waveguide corresponds to a determined wavelength, wherein the determined distance comprises distance or distances at which respective waveguides of the plurality of waveguides are disposed from the reflective surface of the mirror, wherein the at least one output waveguide comprises one waveguide, and wherein the optical apparatus comprises a multiplexer.

15. The apparatus of claim 14, wherein respective ends of the waveguides of the plurality of waveguides are disposed substantially equidistantly relative to an imaginary axis that links a first end and a second end of the reflective surface of the mirror.

16. The apparatus of claim 14, wherein respective ends of the waveguides of the plurality of waveguides are disposed along an imaginary line that forms an angle with an imaginary axis that links a first end and a second end of the reflective surface of the mirror.

17. The apparatus of claim 13, wherein the at least one output waveguide comprises a plurality of waveguides, wherein each output waveguide corresponds to a determined wavelength, wherein the determined distance comprises distance or distances at which respective waveguides of the plurality of waveguides are disposed from the reflective surface of the mirror, wherein the at least one input waveguide comprises one waveguide, and wherein the optical apparatus comprises a demultiplexer.

18. The apparatus of claim 17, wherein respective ends of the waveguides of the plurality of waveguides are disposed substantially equidistantly relative to an imaginary axis that links a first end and a second end of the reflective surface of the mirror.

19. The apparatus of claim 17, wherein respective ends of the waveguides of the plurality of waveguides are disposed along an imaginary line that forms an angle with an imaginary axis that links a first end and a second end of the reflective surface of the mirror.

20. The apparatus of claim 13, wherein the apparatus comprises a computing device.

* * * * *